United States Patent
Vasthimal et al.

(10) Patent No.: US 11,972,494 B2
(45) Date of Patent: *Apr. 30, 2024

(54) DYNAMIC CREATION OF NETWORKS

(71) Applicant: eBay Inc., San Jose, CA (US)

(72) Inventors: Deepak Kumar Vasthimal, San Jose, CA (US); Priyavrath Dakua, Bangalore (IN)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,726

(22) Filed: Jan. 24, 2023

(65) Prior Publication Data

US 2023/0162295 A1 May 25, 2023

Related U.S. Application Data

(63) Continuation of application No. 16/587,846, filed on Sep. 30, 2019, now Pat. No. 11,568,498, which is a continuation of application No. 14/071,361, filed on Nov. 4, 2013, now Pat. No. 10,467,707.

(51) Int. Cl.
*G06Q 30/00* (2023.01)
*G06Q 30/0601* (2023.01)
*G06Q 50/00* (2012.01)

(52) U.S. Cl.
CPC ......... *G06Q 50/01* (2013.01); *G06Q 30/0625* (2013.01)

(58) Field of Classification Search
CPC .................. G06Q 50/01; G06Q 30/0625
USPC .................................. 705/26.1–27.2
See application file for complete search history.

(56) References Cited

U.S. PATENT DOCUMENTS

| | | | | |
|---|---|---|---|---|
| 2008/0222533 A1* | 9/2008 | Hankejh | ................ | G06Q 30/02 715/738 |
| 2013/0103686 A1* | 4/2013 | Sisneros | ................ | G06Q 50/01 707/736 |

OTHER PUBLICATIONS

Brown, Jo; Amanda J. Broderick; Nick Lee; Word of mouth communication within online communities: Conceptualizing the online social network, Journal of Interactive Marketing, vol. 21, Issue 3, 2007, pp. 2-20, https://doi.org/10.1002/dir.20082. (Year: 2007).*

* cited by examiner

*Primary Examiner* — Anand Loharikar
(74) *Attorney, Agent, or Firm* — SCHWEGMAN LUNDBERG & WOESSNER, P.A.

(57) ABSTRACT

Techniques for creating a user network based on user interest in a product are described. For example, a first search query is received from a first client device. The first client device is associated with a first user. A second search query is received from a second client device. The second client device is associated with a second user. The first search query is matched to a product. The second search query is matched to the product. A user network corresponding to the product is created. The first user is added to the user network based on the matching of the first search query to the product. The second user is added to the user network based on the matching of the second search query to the product.

20 Claims, 8 Drawing Sheets

DYNAMIC CREATION OF NETWORKS

CLAIM OF PRIORITY

This Application is a continuation of U.S. application Ser. No. 16/587,846, filed Sep. 30, 2019, which is a continuation of U.S. application Ser. No. 14/071,361, filed Nov. 4, 2013, which is hereby incorporated by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013, All Rights Reserved.

TECHNICAL FIELD

The present application relates generally to data processing and, more specifically, to building a user network based on user interest in a product.

BACKGROUND

A user of an eCommerce website of an online marketplace (e.g., eBay Inc. of San Jose, California) may search the eCommerce website for a product (e.g., a good or a service) the user is interested in purchasing. Another user of the eCommerce website may search for the same or a similar product. Sellers offering products for sale on the eCommerce website sometimes offer bundle deals to purchasers of products on the eCommerce website.

BRIEF DESCRIPTION OF DRAWINGS

Some embodiments are illustrated by way of example and not limitation in the figures of the accompanying drawings, in which.

DETAILED DESCRIPTION

Figure 1:
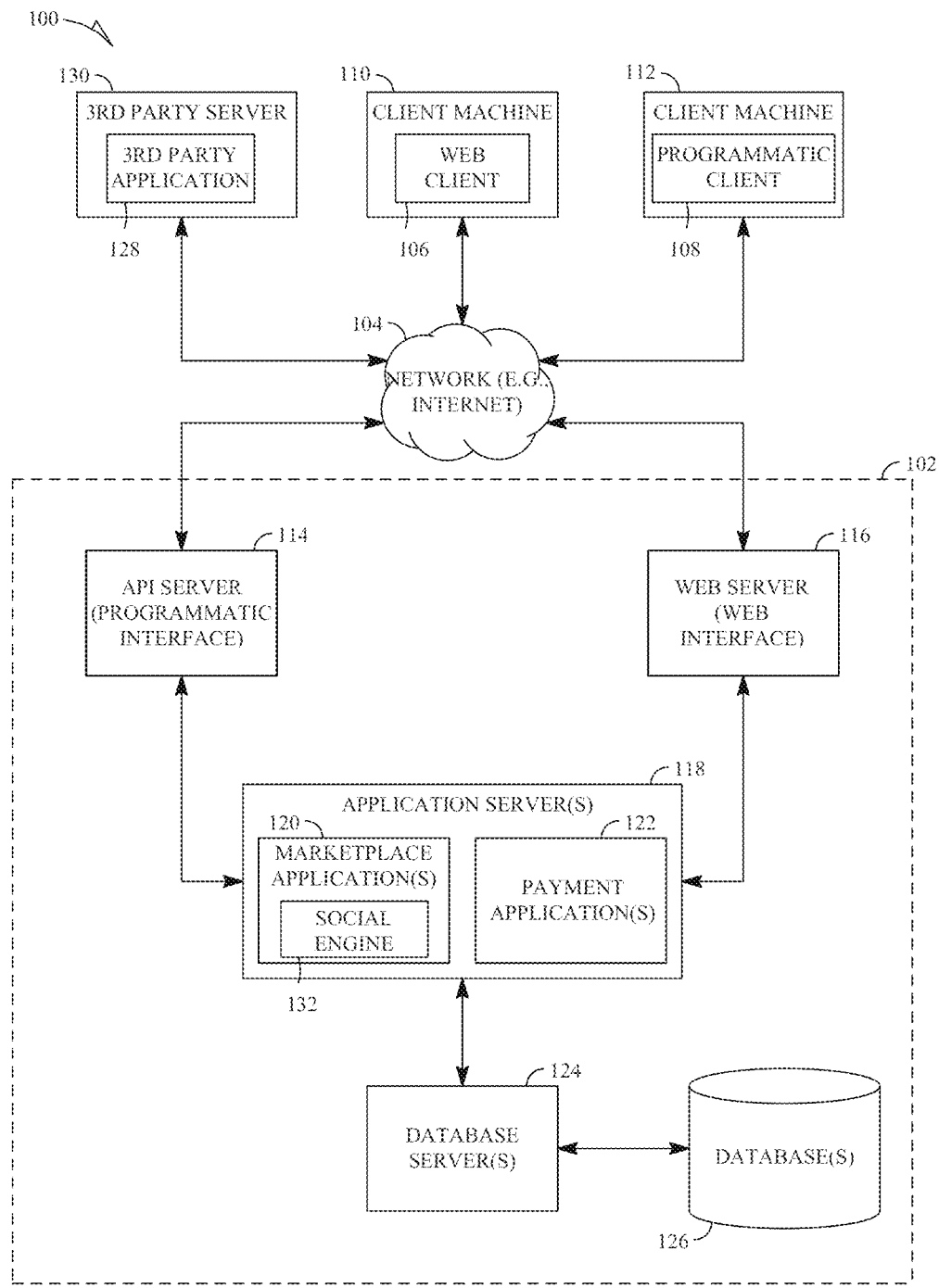
FIG. 1 is a network diagram depicting a client-server system, within which some example embodiments may be deployed.

Example methods and systems to create a user network based on user interest in a product are described. In the following description, for purposes of explanation, numerous specific details are set forth in order to provide a thorough understanding of example embodiments. It will be evident, however, to one skilled in the art that the present invention may be practiced without these specific details.

Generally, users of an eCommerce website (or simply "website") may visit the website because they are interested in purchasing a product (e.g., a good or a service). The users may manifest their interest in the product by searching the web site for the product. Several users may share an interest in the product. Some user may wish to obtain unbiased information about the product (e.g., product features or functionality) from other users. In an example embodiment, a network creating system may create a user network corresponding to a product and may facilitate real time communication among the users added to the user network. A user network may correspond to a particular product, to several similar products, or to products that complement each other. Products may be similar if they have similar functionality (e.g., smartphones, laptops, tablets, etc.), if they pertain to the same brand (e.g., Apple products), or have some other commonality. Products may be complementary if a product assists the functionality of another product (e.g., a smartphone and a smartphone accessory) or otherwise is related to another product.

In an example embodiment, in order to facilitate social interaction among the users interested in a product, the network creating system may identify the users who share an interest in a product and may create a user network that includes the users (also, "members"). The user network corresponds to the particular product searched for by the users. In some instances, a user may be added to the user network automatically by the network creating system based on the user's interest in the product. In other instances, the network creating system may invite a user to join the user network, and may add the user to the user network upon receiving the user's acceptance of the invitation to join.

Different user networks may be created to correspond to different products. A particular user may be a member of a several user networks corresponding to different products in which the user is interested. A member of a user network may be a buyer (e.g., a potential or an actual buyer) of the product, an agent of the buyer, a seller of the product, or an agent of a seller of the product. In some instances, a particular user may be a potential buyer or an actual buyer of a first product and a seller of a second product.

In addition, when creating a user network, the network creating system may identify the locations of the users searching for a particular product. Based on determining that several users interested in the same or similar products are based in the same geographic location (e.g., continent, country, area, zone, city, village, etc.), the network creating system may create location-specific user networks corresponding to the product(s) searched by the users and to the location of the users. Customizing user networks to the location of a group of users allows for better and more fruitful communications among the users. For example, the deals offered by the U.S. sellers on a particular user network with a majority of members located in in the United States may be relevant to the U.S. members of the particular user network but not to the members located in India. Therefore, a user in India may not want to join the particular user network. To facilitate more effective communications among the users of the user networks, the user networks may be grouped based on geo-location. The network creating system may determine the current location of a user and may display to the user the user networks that correspond to the searched product and to the user's location. Alternately, the local user networks may be displayed to a user in a preferential manner as compared to the user networks outside the user's geographical area.

In an example embodiment, upon creating the user network, the network creating system may facilitate real time communications among the network members. The network creating system may generate and manage a communication platform to allow the network members (e.g., actual or potential buyers) to share with each other their knowledge of the product, to receive news and alerts related to the product, to view advertisement corresponding to the product, to start and participate in polls related to the product, to purchase the product based on a group deal, etc. Buyers may communicate and may agree to accept a group deal together (e.g., to buy together a number of items offered as a group deal, such as "buy 5, get 10% off").

Real time communications on the user network may be beneficial to sellers of the product. The sellers may or may not be members of the user network. Obtaining real time information about what products are being searched, who is searching for the products, what opinions (e.g., objections) the potential or actual buyers have, how much the buyers are willing to pay, what products are falling out of favour, etc. may help a seller become more efficient and more effective at selling the seller's products. For example, based on the information learned from buyers or potential buyers, a seller may change the price of the product the seller is selling or may offer a sales deal. In addition, a seller may communicate with another seller on the user network to create and offer a bundle deal to the buyers on the user network. Furthermore, the sellers may communicate in real time with the buyers on the user networks corresponding to the products the sellers are selling.

A seller and a buyer who are members of a user network may want to bypass the eCommerce system and/or the user network corresponding to a product, and engage in a purchase transaction of the product offline. In some example embodiments, the network creating system blocks direct communication between the seller and the buyer in order to discourage such offline transactions between the members of a particular user network. According to certain example embodiments, the network creating system continuously analyzes the communications between the buyer and the seller (e.g., using natural language processing technology). If the network creating system determines, based on the analysis of the buyer-seller communications, that the buyer and the seller engaged in an offline purchasing transaction of the product corresponding to the respective user network, the network creating system may flag or issue a warning to the buyer and the seller, or may disable the seller's and buyer's ability to communicate with each other within the user network and/or eCommerce system.

In addition, real time communications on the user network may be beneficial to the network creating system. In some example embodiments, the network creating system may collect portions of or all the information communicated on a particular user network, as well as data (e.g., user profile, behavioral, reputation, transaction, or feedback data) that pertains to the users added to the user networks. The network creating system may group or categorize the collected information based on the location of the users, demographics (e.g., age or gender), product searched, etc. The network creating system may customize marketing (e.g., promotional) information based on the information gathered from the users of the user networks.

Additionally, the network creating system may make available to the sellers some or all of the collected communication and user data free of charge or based on particular agreements. In some instances, the sellers may dynamically adjust their prices based on a digest of buyer information received from the network creating system. For example, a seller who is selling Product X for 10% off may increase the discount to 12% based on the digest of buyer information.

In some example embodiments, the user network is temporal (e.g., temporary). The temporal user network may exist as long as it includes at least one member. Users may join a temporal network for a period of time. Upon the users' leaving the temporal user network, their identifying information may be removed from one or more records of a database associated with the user network. In certain example embodiments, the temporal user network may be persisted (e.g., made permanent). A temporal user network may be persisted automatically by the network creating system or by one or more users who select to persist the temporal user network.

In various example embodiments, the network creating system is configured to receive a first search query from a first client device. The first client device is associated with a first user. The network creating system matches the first search query to a product, and creates a user network corresponding to the product. The network creating system adds the first user to the user network based on the matching of the first search query to the product. The network creating system is further configured to receive a second search query from a second client device. The second client device is associated with a second user. The network creating system matches the second search query to the product. The network creating system adds the second user to the user network based on the matching of the second search query to the product. In certain example embodiments, the network creating system identifies a third user based on a completed transaction including an instance of the product. Then, the network creating system adds the third user to the user network based on the third user being a party to the completed transaction. The third user may be the seller or the buyer in the completed transaction.

In some example embodiments, the eCommerce system may collect portions of or all the information communicated by users on the eCommerce system, as well as data (e.g., user profile, behavioral, reputation, transaction, or feedback data) that pertains to the users of the eCommerce system. Some or all of the collected data that pertains to the users of the eCommerce website may be shared with the network creating system. According to various example embodiments, the network creating system may utilize the collected data to determine when to create a user network.

In certain example embodiments, the network creating system uses one or more thresholds for various factors involved in determining when to create a user network. For example, the network creating system may create a user network corresponding to the product searched by a user upon determining that the user searched for the product a pre-determined minimum number of times. According to some example embodiments, the network creating system receives a search query from the user and matches the search query to a product. The network creating system increases a search count associated with the user and the product by one. Then, upon determining that the search count exceeds a threshold value, the network creating system creates a user network corresponding to the product. The user may be added to the user network automatically or based on accepting an invitation to join the user network.

FIG. 1 is a network diagram depicting a client-server system 100, within which various example embodiments may be deployed. A networked system 102, in the example form of a network-based marketplace or publication system, provides server-side functionality, via a network 104 (e.g., the Internet or Wide Area Network (WAN)) to one or more clients. FIG. 1 illustrates, for example, a web client 106 (e.g., a browser) and a programmatic client 108 executing on respective client machines (e.g., client devices) 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. In various example embodiments, the marketplace applications 120 may include a social engine 132. The social engine 132, in some example embodiments, may create a user network comprising a plurality of users interested in a product and may facilitate the social interaction of the users interested in the product. The social engine 132 may be implemented in a computer system, in whole or in part, as described below with respect to FIG. 10. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, California) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
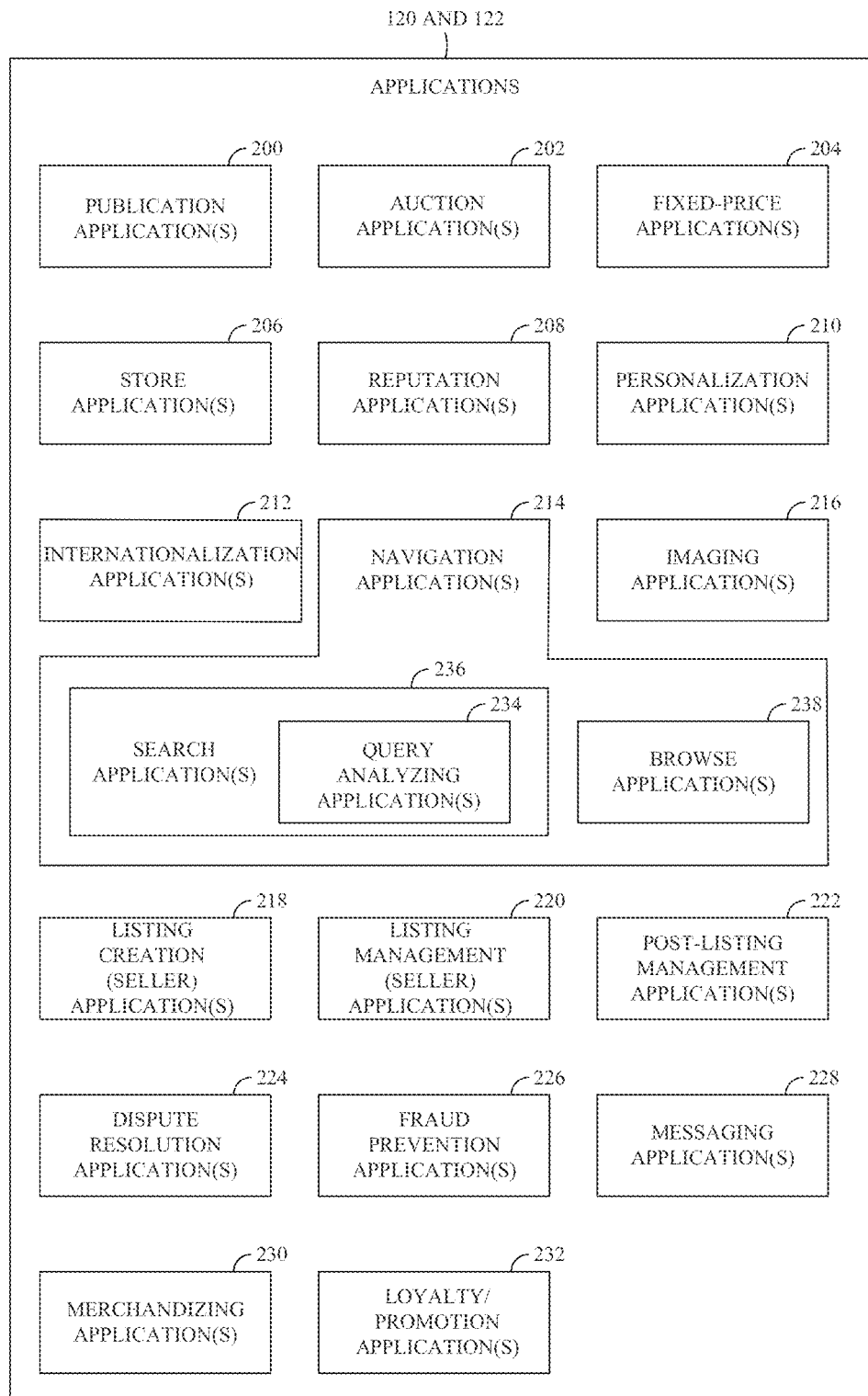
FIG. 2 is a block diagram illustrating marketplace and payment applications that, in some example embodiments, are provided as part of the networked system of FIG. 1.

FIG. 2 is a block diagram illustrating marketplace and payment applications 120 and 122 that, in some example embodiments, are provided as part of the networked system 102 (e.g., the network creating system). The applications 120 and 122 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 128.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, California) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application 236 (as an example of a navigation application) may enable key word searches of listings published via the networked system 102. A browse application 238 may allow users to browse various category, catalogue, or inventory data structures according to which listings may be classified within the networked system 102. Various other navigation applications may be provided to supplement the search and browsing applications. For example, query analyzing applications 234 may analyze queries. The queries may be provided by a user, including a person or a machine, for example, via the 3rd party application 128, the web client 106, or the programmatic client 108. The queries may be received by the networked system 102 via, for example, the API server 114 or the web server 116, or otherwise be provided to or accessible by the application servers 118. The queries may be stored in a memory, a transaction log, the database 126, a file system, or another storage medium. The queries may be related to a purchase of one or more products, such as one or more products contained in an inventory associated with the networked system 102. The query analyzing applications 234 may determine associations between queries and other data, including product purchases, and may store information about the associations.

In order to make listings, available via the networked system 102, as visually informing and attractive as possible, the marketplace applications 120 may include one or more imaging applications 216 which users may utilize to upload images or videos for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of operations in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 80 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotions points for each transaction established and/or concluded with a particular seller, and may be offered a reward for which accumulated loyalty points can be redeemed.

Figure 3:
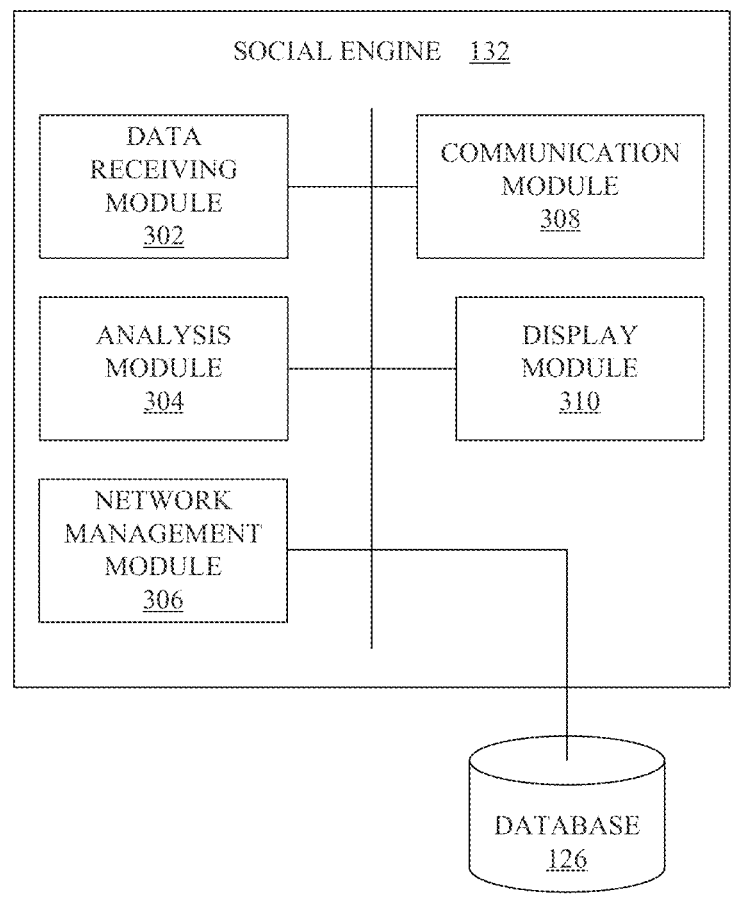
FIGS. 3-5 are block diagrams of certain modules on an example social engine, consistent with some example embodiments.

FIG. 3 is a block diagram of certain modules of an example social engine, consistent with some example embodiments. The social engine 132 is shown to include a number of modules that may be in communication with each other. One or more modules of the social engine 132 may reside on a server, client, or other processing device. One or more modules of the social engine 132 may be implemented or executed using one or more hardware processors. In some example embodiments, one or more of the depicted modules are implemented on a server of the network-based system 102. In FIG. 3, the social engine 132 is shown as including a data receiving module 302, an analysis module 304, a network management module 306, a communication module 308, and a display module 310 configured to communicate with each other (e.g., via a bus, shared memory, or a switch). Also shown in FIG. 3 is a database 126 configured to communicate with one or more modules of the social engine 132.

According to some example embodiments, the data receiving module 302 is configured to receive a first search query from a first client device and a second search query from a second client device. The first client device is associated with a first user. The second client device is associated with a second user.

The analysis module 304 is configured to match the first search query to a product. The analysis module 304 is further configured to match the second search query to the product. In certain example embodiments, the first search query (from the first client device) includes a first keyword and the second search query (from the second client device) includes a second keyword. The analysis module 304 may match the first search query to the product based on determining that the first keyword is included in a group of keywords that identify the product. Similarly, the analysis module 304 may match the second search query to the product based on determining that the second keyword is included in the group of keywords that identify the product. In some instances, the first keyword and the second keyword are different keywords.

In some example embodiments, the analysis module 304 includes a mechanism to determine a particular user's user intent with respect to the product (e.g., interest in purchasing the product) based on data corresponding to the particular user. For example, data from search queries, search result selections, purchase history, item views, wish lists, or feedback generated by the particular user may be utilized in determining the particular user's intent with respect to a particular product. The analysis module 304 may utilize one or more algorithms that take as input parameters some or all of this user data to calculate a particular user's intent score with respect to a product. A user's intent score that is higher than other users' intent scores with respect to the product may indicate a positive view of the product. In some instances, the higher user intent score may also indicate the user's interest in purchasing the product.

In some example embodiments, the first user and the second user are buyers (or potential buyers) of the product. The analysis module 304 may determine a first user sentiment score for the product based on input data pertaining to the first user and a second user sentiment for the product based on input data pertaining to the second user. The first user sentiment score corresponds to the first user, and the second user sentiment score corresponds to the second user. Upon determining the first user sentiment score and the second user sentiment score for the product, the analysis module 304 may generate an aggregate user sentiment score for the product based on the first user sentiment score and the second user sentiment score. For example, the analysis module 304 may combine the first user sentiment score and the second user sentiment score using one or more formulas. The analysis module may communicate the aggregate user sentiment score to the communication module 308, described in more detail below. The communication module 308 may receive the aggregate user sentiment score from the analysis module 304 and may transmit a communication including an indication of the aggregate user sentiment score to one or more sellers of the product. The one or more sellers of the product may or may not be members of the user network.

The analysis module 304 is further configured to generate one or more search results based on matching the first search query to the product. The analysis module 304 is further configured to generate one or more additional search results based on matching the first search query to the product. Based on a variety of factors (e.g., the times when the first and second search queries are received and/or matched to the product), the one or more search results and the one or more additional search results may or may not be the same.

The network management module 306 is configured to create a user network corresponding to the product, add the first user to the user network based on the matching of the first search query to the product, and add the second user to the user network based on the matching of the second search query to the product. The network management module 306 is described in more detail below with respect to FIG. 4.

The communication module 308 is configured to facilitate a communication among a plurality of users added to the user network. The plurality of users includes the first user and the second user. In some example embodiments, the communication module 308 is further configured to transmit communications by the network creating system to users of the eCommerce website before and after they join the user network. The communication module 308 may also receive communications from the users. The communication module 308 is described in more detail below with respect to FIG. 5.

The display module 310 is configured to generate a user interface for communication among a plurality of users added to the user network including the first user and the second user. The display module 310 may present the user interface to the plurality of users via a client device of each of the plurality of users. The display module 310 may be in communication with the communication module 308 which, in some example embodiments, is further configured to receive a communication by the first user from the first client device via the user interface and to broadcast the communication (or a portion of the communication) by the first user to the plurality of users via the user interface.

For example, the display module 310 may display the user interface on a client device of a particular user, may receive data input provided by the particular user via the user interface, may transmit the received data input to the communication module 308 to be broadcasted to the plurality of users via the user interface provided to the client device of each of the plurality of users. The display module 310 may also receive additional data (e.g., data provided by another user of the plurality of users in response to the broadcasted communication) from the communication module 308, and may display the additional data to the particular user. Alternatively or additionally, a portion or the entirety of the communication by the first user received from the first client device via the user interface may be displayed to a particular user of the plurality of users via the user interface presented to the client device associated with the particular user.

Any two or more of these modules may be combined into a single module, and the functions described herein for a single module may be subdivided among multiple modules. Furthermore, according to certain example embodiments, the modules described herein as being implemented within a single machine, database, or device may be distributed across multiple machines, databases, or devices.

Figure 4:
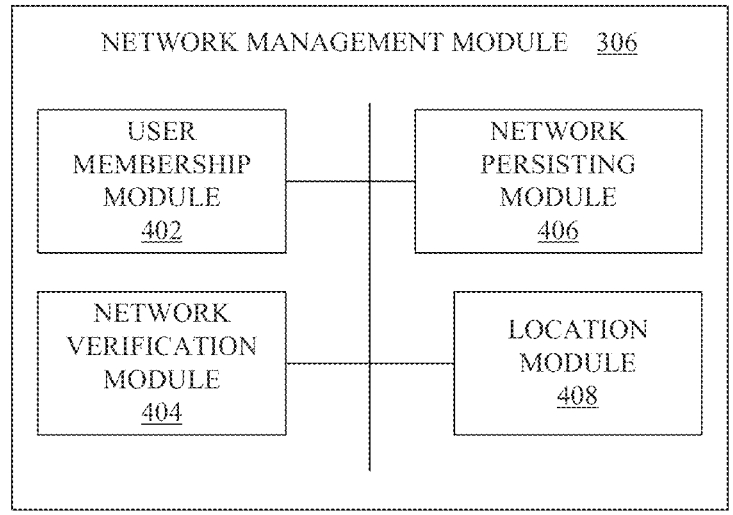

FIG. 4 is a block diagram of certain modules of an example social engine, consistent with some example embodiments. In some example embodiments, as illustrated in FIG. 4, the network management module 306 includes a number of modules that may be in communication with each other. In FIG. 4, the network management module 306 is shown as including a user membership module 402, a network verification module 404, a network persisting module 406, and a location module 408 configured to communicate with each other (e.g., via a bus, shared memory, or a switch).

According to certain example embodiments, the user membership module 402 is configured to transmit, based on matching the first search query to the product, a notification to the first client device. The notification may invite the first user to join the user network corresponding to the product. The user membership module 402 may receive, from the first client device, an acceptance by the first user of the invitation to join the user network. The acceptance by the first user may be communicated in a response to the notification transmitted by the user membership module 402. In some example embodiments, the user network is created (e.g., by the network management module 306) in response to receiving the acceptance by the first user.

Similarly, the user membership module 402 may transmit a notification to the second client device based on matching the second search query to the product. The notification may invite the second user to join the user network corresponding to the product. The user membership module 402 may receive, from the second client device, an acceptance by the second user of the invitation to join the user network. The acceptance by the second user may be communicated in a response to the notification transmitted by the user membership module 402.

In some example embodiments, the network management module 306 adds the first user and the second user automatically to the user network based on the first query and the second query being matched to the product. The network creating system may give the first user and the second user an option to opt out of the user network after the first user and the second user are automatically added to the user network.

The network verification module 404 is configured to determine that the user network corresponding to the product does not exist and to create the user network corresponding to the product based on determining that the user network corresponding to the product does not exist.

In some example embodiments, the user network is temporal (or temporary). A temporal user network may exist as long as at least one user of a plurality of users is logged into the temporal user network. The temporal user network may be shut down after the last user of the plurality of users leaves the temporal user network. In certain example embodiments, the network creating system may allow a user who left the temporal user network to return to the temporal user network during a predetermined period of time. For example, upon a user leaving a temporal user network, the network creating system may transmit a communication to the user in which the user is notified that the user may return to the temporal user network within the next seven days. Also, the communication may include a recommendation that the user persists the temporal user network to allow the user to return to the temporal user network past the seven days.

According to various example embodiments, the network verification module 404 records the time the temporal user network was formed to indicate how new or old the temporal user network is. The formation time may be displayed to a user in a user interface that includes a reference to the temporal user network. A user who visits several temporal user networks may be provided a mechanism to tag or identify the visited temporal user networks to which the user may want to return.

In some example embodiments, to be able to return to a temporal user network, one or more users of the plurality of users added to the temporal user network may persist the temporal network (if not yet persisted by another user). For instance, the first user may select (e.g., click on) a "persist the network" element of a user interface to request that a particular temporal user network be persisted.

The network persisting module 406 is configured to receive a request to persist the temporal user network. The request may be received from at least one of the first client device or the second client device (or a client device of another user of the plurality of users added to the user network). The network persisting module 406 may persist the temporal user network based on the request to persist the temporal user network. The persisting of the temporal user network results in a permanent user network. For example, network persisting module 406 changes the status of a particular user network from "temporal" to "persisted".

The location module 408 is configured to receive a first geo-location datum corresponding to the first client device and a second geo-location datum corresponding to the second client device. The location module 408 may determine that the first geo-location datum and the second geo-location datum identify a location common to the first user and the second user. In some example embodiments, the user network that corresponds to the product further corresponds to the location.

Figure 5:
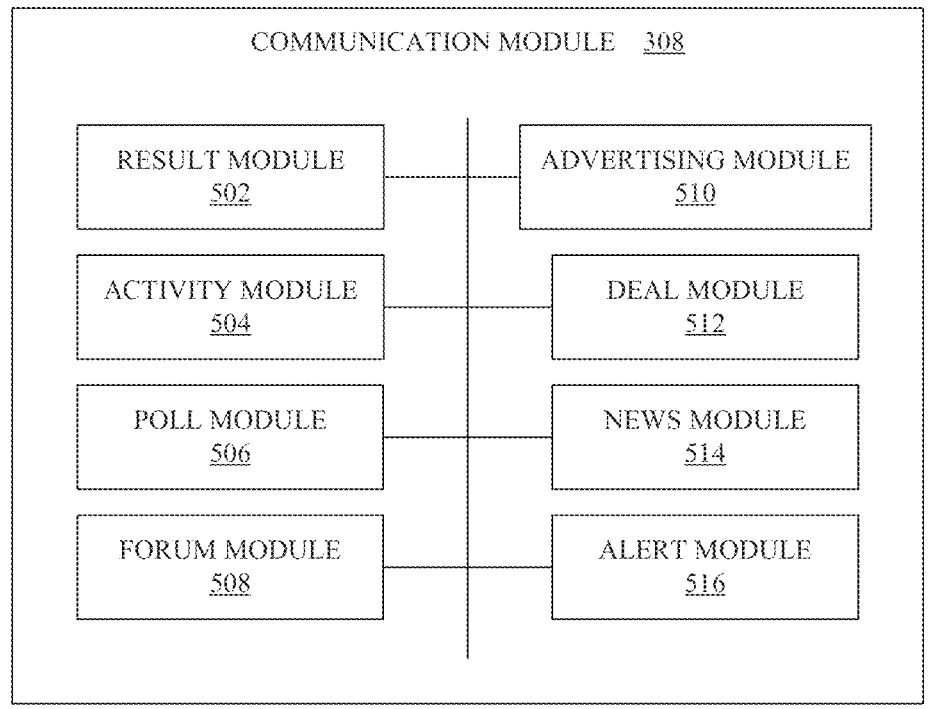

FIG. 5 is a block diagram of certain modules of an example social engine, consistent with some example embodiments. In some example embodiments, as illustrated in FIG. 5, the communication module 308 includes a number of modules that may be in communication with each other. In FIG. 5, the communication module 308 is shown as including a result module 502, an activity module 504, a poll module 506, a forum module 508, an advertising module 510, a deal module 512, a news module 514, and an alert module 516 configured to communicate with each other (e.g., via a bus, shared memory, or a switch).

According to some example embodiments, the result module 502 is configured to receive one or more search results generated by the analysis module 304, to format the one or more search results for presentation in response to a search query, and to present the one or more formatted search results to a user of the user network. The presenting of the one or more formatted search results may occur via the user interface generated by the display module 310.

The activity module 504 is configured to receive input data that pertains to an activity by a particular user of the user network and to present (e.g., broadcast) the activity to the plurality of users of the user network.

The poll module 506 is configured to provide a poll interface to at least one of the first client device or the second client device to facilitate the initiation of a poll of one or more users added to the user network. In some example embodiments, the poll module 506 receives a request to initiate a poll of one or more users with respect to a particular topic. The request to initiate the poll may be received from the client device of one of the plurality of users of the user network. In response to the request to initiate a poll, the poll module 506 requests the generation of a poll interface by the display module 310. Upon the display module 310 generating the poll interface, the poll module 506 provides the poll interface to the client devices of a plurality of users added to the user network (or to a subgroup of the plurality of users who communicated their intent to participate in the poll). In some example embodiments, the client devices may display the poll interface as part of the user interface utilized to facilitate the communication among the plurality of users of the user network.

The forum module 508 is configured to provide an online forum interface to at least one of the first client device or the second client device to facilitate posting of information about the product to an online forum corresponding to the product. The display module 310 may generate and transmit the online forum interface to the forum module 508 to be provided to the client devices of the plurality of users added to the network. In some instances, the at least one of the first user or the second user is a buyer of the product. Alternatively or additionally, the at least one of the first user or the second user is a potential buyer of the product. The forum module 508 facilitates communication (e.g., an exchange of information) about the product (e.g., a feature, functionality, or performance of the product) among a plurality of users added to the user network by allowing the plurality of users to post comments about the product on the online forum via the online forum interface. Alternatively or additionally, the users of the online forum may share their feedback about particular sellers of the product via the online forum interface. The online forum may assist actual and potential buyers in evaluating the product based on knowledge shared by other users of the user network.

The advertising module 510 is configured to present an advertisement associated with the product to at least one of the plurality of users of the user network based on matching the at least one user's search query to the product. The advertisement associated with the product may be an advertisement of the product or an advertisement of a co-related product (e.g., an accessory to the product). In some example embodiments, the advertisement associated with the product may include an advertisement of a deal pertaining to the product.

The deal module 512 is configured to present a deal associated with the product to at least one of the plurality of users of the user network based on matching the at least one user's search query to the product. Examples of a deal associated with a product are: a sale, a discount, a promotion, a coupon, a certificate, a voucher, etc. In some example embodiments, the deal presented to a particular user is based on the user's opinion of the product, level of interest in the product, or activity with respect to the product (e.g., viewed listings of the product, placed the product on a wish list, participated in a poll about the product, etc.)

The news module 514 is configured to present news associated with the product. In some example embodiments, the news module 514 provides a user interface to at least one of the first client device or the second client device to facilitate a broadcasting of content that pertains to the product to a plurality of users added to the user network. The content may include a product announcement, a product alert, a product recall, a product update, etc. The content may be provided by the networking creating system, by the manufacturer of the product, or by a user of the user network (e.g., an actual or a potential buyer, or a seller). In some example embodiments, the news module 514 provides a user interface to at least one of the first client device or the second client device to facilitate the displaying of a newsletter pertaining to the product to one or more users added to the user network.

The alert module 516 is configured to generate and present product alerts to the users added to the user network. In some example embodiments, the alert module 516 provides a user interface to at least one of the first client device or the second client device to facilitate a transmittal of a product alert that pertains to the product to one or more users added to the user network. The product alert may be provided by the networking creating system, by the manufacturer of the product, or by a user of the user network (e.g., an actual or a potential buyer, or a seller).

Any two or more of these modules may be combined into a single module, and the functions described herein for a single module may be subdivided among multiple modules. Furthermore, according to certain example embodiments, the modules described herein as being implemented within a single machine, database, or device may be distributed across multiple machines, databases, or devices.

Figure 6:
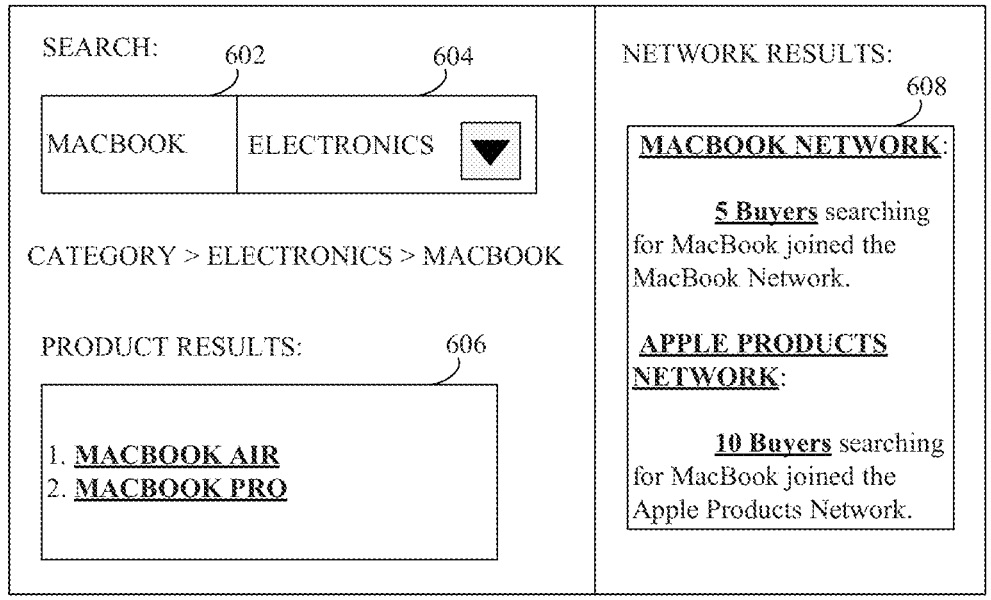
FIG. 6 is an example portion of a user interface for a method for providing a user access to a user network created based on user interest in a product, according to various example embodiments.

FIG. 6 is an example portion of a user interface 600 for a method for providing a user access to a user network created based on user interest in a product, according to various example embodiments. In some example embodiments, the user interface 600 may be displayed on a client device of a user. As shown in FIG. 6, a portion of the user interface 600 provides a search field 602 in which the user may input (e.g., enter, type, select from a number of options, etc.) a search query. The search query may be one or more keywords (e.g., the keyword "MACBOOK"). Also shown in the user interface 600, is a category drop-down list 604 which the user may utilize to select a category of products to be searched for a product that matches the search query. The user may activate the category drop-down list by selecting (e.g., clicking) on the black triangle located at the right end of the drop-down list. Upon the activation of the category drop-down list 604, the user interface 600 allows the user to select the category "Electronics" in the category drop-down list 604. In addition, the user interface 600 may display a search path (e.g., CATEGORY>ELECTRONICS>MACBOOK) to provide a reminder to the user of the user's search and to facilitate the user's interaction with the user interface 600.

Upon receiving the user's search criteria (e.g., the search query and/or the selected product category), the user interface 600 may communicate the user's search criteria to the network creating system (e.g., the analysis module 304). The network creating system may match the search criteria to a product, may identify one or more listings provided by the eCommerce system for the product, and may communicate the one or more listings to the user interface 600. Additionally, the network creating system may identify one or more user networks corresponding to the product and may communicate the one or more user networks to the user interface 600. In some example embodiments, if the network creating system determines that no user network exists that corresponds to the product, the network creating system may create a user network corresponding to the product and may add the user to the user network based on matching the user's search criteria (e.g., the search query) to the product. Then, the network creating system transmits to the user interface 600 a communication that includes an identifier of the created user network corresponding to the product.

The user interface 600 may receive the one or more listings and may display the one or more listings, or one or more identifiers of the product(s), as product results 606. For example, in response to the search query "MACBOOK" 602 entered by the user, the user interface 600 may display the product identifiers "MACBOOK AIR" and "MACBOOK PRO" as products results 606. The product identifiers displayed as product results 606 may include (e.g., may be) selectable links. By clicking on a product identifier that is a selectable link, the user may be presented one or more listings of the product identified by the product identifier. For example, by selecting "MACBOOK AIR" in the product results 606, the user may be presented with a number of listings for the MacBook Air product.

The user interface 600 may also receive from the network creating system the communication that includes the identifiers of one or more user networks corresponding to the product. The user interface 600 may display the identifiers of the one or more user networks corresponding to the product as part of network results 608. According to an example embodiment shown in FIG. 6, the user interface 600 displays two user networks: "MACBOOK NETWORK" and "APPLE PRODUCTS NETWORK". Additional information about the number of buyers interested in the MacBook product who have joined a particular user network is included in the network results 608. For example, the user interface 600 shows that five buyers who searched for the MacBook product have joined the MacBook Network, and that ten buyers who searched for the MacBook product have joined the Apple Products Network.

Certain portions of the network results 608 may include (e.g., may be) selectable links. For example, as illustrated in the network results area 608 of FIG. 6, "MACBOOK NETWORK", "5 buyers", "APPLE PRODUCTS NETWORK", and "10 buyers" are selectable links. Upon receiving a selection by the user of a selectable link that corresponds to one of the user networks, the network creating system may provide to the user a further user interface that displays information about the user network corresponding to the chosen selectable link and provides a communication platform for the users added to the respective user network. An example of the further user interface is described below with respect to FIG. 8.

In some example embodiments, the user is automatically added to a user networks corresponding to the product upon entering a search query for the product. In certain example embodiments, the user is automatically added to a user network based on selecting a selectable link that corresponds to the user network. In other example embodiments, a user is added to a user network upon accepting an invitation to join a particular user network that corresponds to the product searched for by the user.

Upon receiving a selection by the user of a selectable link that corresponds to a number of users who joined a particular user network, the network creating system may provide the user a list of user identifiers that identify the user added to the respective user network. In some example embodiments, the network creating system may also provide a mechanism to facilitate an initiation of contact with a particular user added to the user network.

In some example embodiments, the network creating system presents the user interface 600 only to buyers based on determining that the users who entered the search queries are buyers. The determination that the users are buyers may be made based on data that pertains to the users and that is available to the network creating system.

Figure 7:
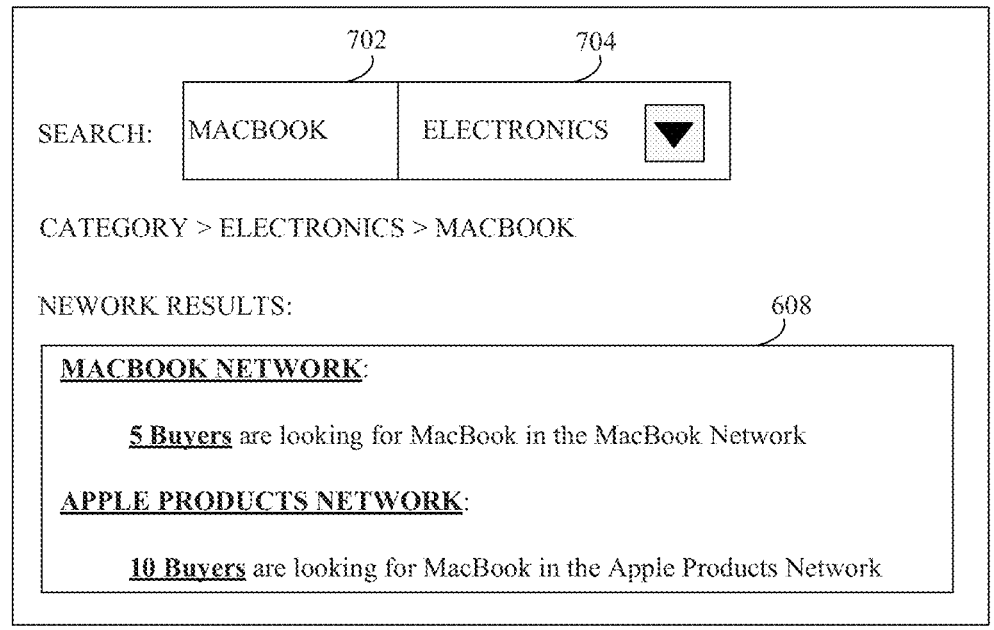
FIG. 7 is an example portion of a user interface for a method for providing a seller access to a user network created based on user interest in a product, according to various example embodiments.

FIG. 7 is an example portion of a user interface 700 for a method for providing a seller access to a user network created based on user interest in a product, according to various example embodiments. According to some example embodiments, a seller may enter the search query "MACBOOK" in a search field 702 to request a list of all the user networks associated with the MacBook and its accessories. In response to the search query, the network creating system may presents identifiers of one or more user networks for the seller to select from. The seller may join a respective user networks and may dynamically provide deals (e.g., group deals) at run time. In some example embodiments, once a user network is created, the user network is categorized to facilitate searching for user networks.

In some example embodiments, upon receiving the search query (that may or may not specify a category 704) from a client device of a user via the user interface 700, the network creating system may determine that the user is a seller of a MacBook product based on data that pertains to the user and that is available to the network creating system. Because the seller may not be interested in purchasing a MacBook product, the network creating system may present the network results 608 to the seller and may not present the product results 606. The seller may select one or more of the selectable links "MACBOOK NETWORK" and "APPLE PRODUCTS NETWORK" to view or to join the respective user network(s).

Figure 8:
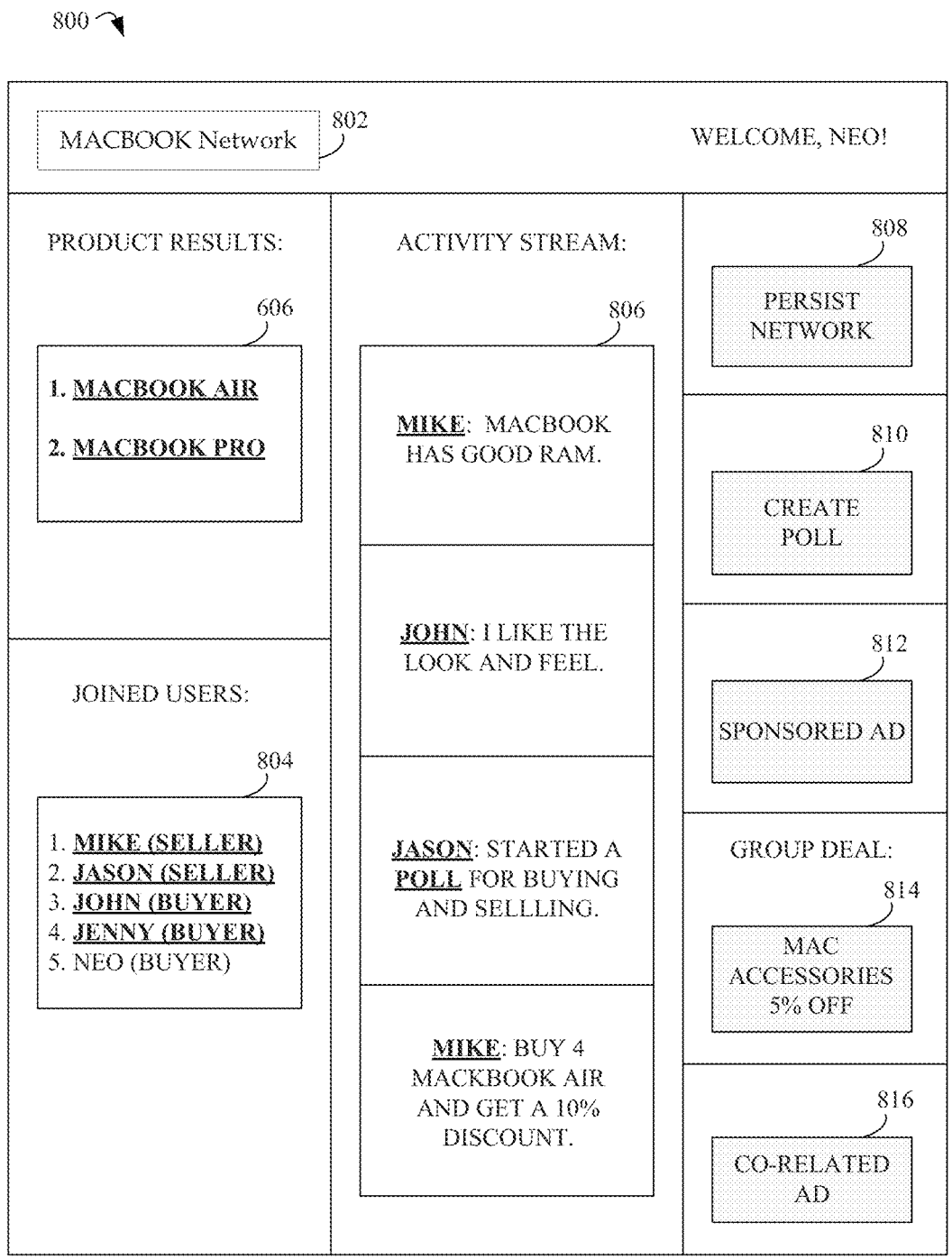
FIG. 8 an example portion of a user interface for a method for facilitating communication among users added to a user network created based on user interest in a product, according to various example embodiments.

FIG. 8 an example portion of a user interface 800 for a method for facilitating communication among users added to a user network created based on user interest in a product, according to various example embodiments. In certain example embodiments, the user interface 800 may be presented to the users added to the user network to facilitate communication among the users. The user interface 800 may allow the members of the user network to chat with each other, create polls (e.g., to discuss and agree to accept a deal offered by a seller), view users' activities on an activity stream, to learn details about the product, view ads about the product, etc. Users may learn details about product from other users (e.g., buyers, sellers, or agents of buyers or sellers), or from information automatically provided by the network creating system.

In some example embodiments, as shown in FIG. 8, a portion of the user interface 800 identifies the user network as MACBOOK Network 802, and provides a welcome message (e.g., "Welcome, Neo!") to the user on whose client device the user interface 800 is displayed. The user interface 800 may display the product results 606 and a list of joined users 804. The list of joined users may include user identifiers (e.g., first names) that identify members of the user network. The joined users 804 may be sellers or buyers, and may be identified as such on the user interface 800. By identifying the status (or role) of each user of the joined users 804, the network creating system provides transparency and information useful in facilitating communication among the users. One or more user identifiers include selectable links to facilitate the initiation of contact among the users.

In some instances, a first user clicking on a second user's name included in the joined users 804 generates a request to initiate a communication with the second user. The network creating system receives the request to initiate the communication with the second user and provides a communication mechanism in response to the request to initiate the communication. Examples of the communication mechanism are a chat platform or an online forum accessed via the user interface 800. The communication mechanism may also include email, message board, texting, audio, video, or animation functionality.

The user interface 800 may also display an activity stream 806 that includes information pertaining to users' activities in relation to the product. The activity stream 806 may include or may be combined with one or more functionalities of the communication mechanism described above. Once a user network is formed and the user interface is presented to the users added to the network, one or more users may post updates of their activities to the activity stream 806. For example, Mike, a seller, may state "MacBook has good RAM"; John, a buyer may state "I like the look and feel (of MacBook products)"; and Mike make a bundle deal offer "Buy 4 MacBook Air and get a 10% discount." The activity information included in the activity stream 806 may be updated in real time. The users may view the updates in the Activity Stream 806 in real time. This allows the users to see what other people are searching for and what they are interested in. For example, a user interested in a MacBook product may learn in real time from the communications occurring on the user network (e.g., information shared on the Activity Stream 806) about certain advantages or disadvantages of the MacBook products. This knowledge may allow the user to make a more informed decision when contemplating purchasing a particular MacBook product.

In various example embodiments, the network creating system receives a communication by the first user from the first client device (e.g., via the user interface 800). The communication may include one or more keywords identifying the product. The network creating system displays the communication on a user interface (e.g., user interface 800) presented to a plurality of users added to the user network, including the first user. The network creating system also displays information about the product on the user interface presented to the plurality of users including the first user based on the one or more keywords.

In some example embodiments, the network creating system receives a communication by the first user from the first client device. The communication may be an user activity update, an initiation of a poll, news about the product, an offer for sale of the product, a deal offer, a promotion, a product alert, feedback about the product, etc. The network creating system displays the communication on a user interface (e.g., in the activity stream 806) presented to a plurality of users added to the user network, including the first user. The network creating system determines an opinion of the first user about the product based on the communication, and displays information about the product on the user interface presented to the plurality of users based on the opinion of the first user. The opinion of the user about the product may be determined at least in part based on keyword and sentence analysis of the communication by the first user. Other information that pertains to the user (e.g., search queries, product views, wish lists, product purchases, etc.) may be considered when determining the user's opinion about the product.

In certain example embodiments, the information about the product displayed to the plurality of users includes at least one of a sale deal or promotion provided automatically by the eCommerce system, a sale deal or promotion provided by a seller, a group deal that offers a discount for a purchase of a specific number of instances of the product, an advertising sponsored by a seller, or a co-related advertising that advertises an item that is complementary to the product. The seller may or may not be a user added to the user network. As illustrated in FIG. 8, a portion of the user interface 800 may display a sponsored ad 812, a co-related ad 816, or a group deal 814.

Additionally, the network creating system may facilitate the transmittal of a product alert that pertains to the product to one or more users added to the user network. In some example embodiments, the product alert is broadcast to the plurality of users added to the user network (e.g., when the product alert is posted by a user of the user network). In certain example embodiments, the product alert is transmitted to one or more users selected based on a pre-defined criterion (e.g., the one or more users are actual buyers of the product). The product alert may be broadcast in the activity stream 806, in an online forum, in a sponsored ad 812, in a message board, or in a chat platform provided, for example, via the user interface 800, or via email messages. Alternatively, the product alert may be selectively provided to a group of users utilizing personal notifications (e.g., via email messages).

In some example embodiments, the network creating system may transmit a communication to a plurality of users added to the user network who are buyers of the product. The communication may include a new product announcement about a new product. The new product may be related to the product. For example, the product and the new product may be part of a family of products, such as the Apple products. Alternatively or additionally, the new product may be a new version of the product. The new product announcement may be included in a variety of communication mechanisms, such as a co-related ad 816, a sponsored ad 812, the activity stream 806, a message board, email messages, or an online forum.

According to various example embodiments, the network creating system may transmit a communication to a plurality of users added to the user network who are potential buyers of the product. The communication may include a promotion associated with the product. The promotion may be applied during a transaction pertaining to the product. The communication may be transmitted on behalf of a seller or of the eCommerce system to the plurality of users to motivate one or more of the plurality of users to purchase the product. The communication including the promotion may be presented in a variety of ways, for example, via a sponsored ad 812, in the activity stream 806, in a message board, in email messages, or in an online forum interface.

In response to transmitting the communication including the promotion associated with the product, the network creating system may receive data pertaining to one or more of the plurality of users completing a transaction pertaining to the product. The network creating system may generate a record in a database (e.g., the database 126) that identifies the communication, the promotion, an identifier of the product purchased, user identifier(s) of the parties to the transaction(s), or a suitable combination thereof, to document (e.g., record) a successful marketing or sales campaign.

The user interface 800 may also include a "create a poll" selectable element 810. A user added to the user network may request the initiation of a poll by selecting the selectable element 810. A poll may be initiated by one or more users to discuss a topic (e.g., the possibility of making a group purchase of a product or of accepting a group deal offered by a seller). In some example embodiments, the poll is initiated by a potential buyer, pertains to a potential purchase of one or more instances of the product, and is addressed to one or more other users who are potential buyers.

In certain example embodiments, the network creating system determines that a user has an interest in purchasing the product at least partially based on the user's participation in a poll. The determination that the user has an interest in purchasing the product may also be made based on user activity data pertaining to the user (e.g., product views, wish lists, online forum posts, updates in the activity stream 806, etc.) Upon determining that the user has an interest in purchasing the product, the network creating system identifies a level of the interest of the user in the product based on user activity data that corresponds to the first user. The network creating system may determine that the level of interest of the first user exceeds a threshold value. Based on determining that the level of interest of the first user exceeds a threshold value, the network creating system presents a promotion associated with the product to the user (e.g., via the user interface 800).

The network creating system may collect user interest data pertaining to a user's interest in the product, may analyze the user interest data, and may make the resulting analysis or the user interest data available to one or more sellers of the product. In some example embodiments, the network creating system receives a request to present information about the product to one or more users added to the user network. The presenting of the information is based on a criterion selected by one (e.g., a seller) of a plurality of users added to the user network. The network creating system determines, based on the selected criterion, the one or more users to be presented the information and presents the information to the one or more users in response to the request to present the information. An example of a criterion is the user may be a potential buyer with a particular level of interest in the product.

As described above with respect to FIG. 4, the user network may be temporal or permanent. In some example embodiments, the user network, when first created, is a temporal (or temporary) user network. A temporal user network exists as long as at least one member is logged into the temporal user network. The temporal user network is shut down after the last user leaves the temporal user network.

To avoid the shutting down of a temporal network when the last user leaves the temporal user network, in some instances, it may be beneficial to transform the temporal user network into a permanent (or persisted) user network. This may allow users to return to the persisted user network at a later time. Transforming the temporal user network into a permanent user network may have the additional benefit of allowing the users of the persisted user network to access additional member data (e.g., phone number, email address, etc.) to continue a conversation offline. Persisting a temporal user network may allow users to become more familiar with other users of the persisted users and to develop a greater degree of trust between users. For example, continuous communication with some users of the persisted user network may help identify users who are experts in particular fields. The communication with such an expert may be beneficial to other users, as well as to the network creating system.

According to some example embodiments, a portion of the user interface 800 of FIG. 4 includes a "Persist Network" selectable element (also "button") 808 that allows a user of the temporal user network to persist (or select to make permanent) the temporal user network. The user may issue a request to persist the temporal user network by selecting (e.g., clicking on) the "Persist Network" selectable element 808. Upon receiving the user's selection of the "Persist Network" selectable element 808 via the user interface 800, the client device of the user transmits a request to persist the particular temporal user network to the network creating system (e.g., the network persisting module 406). In response to the request to persist the temporal user network, the network persisting module 406 persists the particular temporary user network. The user who persists the network may automatically join the persisted user network permanently. For instance, the user's status may change from a user of the particular temporal user network to a user of the particular persisted user network. The user's status may not change with respect to another temporal user network to which the user was added and which was not persisted.

In certain example embodiments, the network creating system automatically persists a temporal user network. For example, a temporal user network that is popular among the users (e.g., ranks higher than other temporal user network based on the number of users of the temporal user network) may be persisted automatically. Alternatively or additionally, temporal user networks associated with best-selling products may be persisted automatically. In certain example embodiments, a plurality of temporal user networks that are associated with the same product may be consolidated and persisted into one permanent user network.

Upon a temporal user network being persisted (by a user or automatically), the network creating system may transmit communications to the members added to the temporal user network to invite them to join the persisted user network permanently. The members may accept or decline the invitation. A user may decline the invitation to join the persisted user network in order to preserve the user's privacy. Also, a user who joined a large number of a large number of persisted user networks, the user may have an unmanageable number of persisted user networks.

Upon a user joining the persisted user network, a unique URL (associated with the persisted user network) for accessing the persisted user network is provided to the user of the persisted user network. The user may utilize the unique URL to return to the particular persisted user network.

If a temporal user network is not persisted, the temporal user network is shut down upon the last user leaving the temporal NW. In some example embodiments, a portion or all data that pertains to one or more users of a temporal user network from which all the users left is removed from a record in a database (e.g., the database 126). If a user searches for a shut-down temporal user network, the system may not display a reference to the shut-down temporal user network and may not allow the user access to the shut-down temporal user network.

A persisted (or permanent) user network exists even after the last member logs out of the user network. In a persisted user network, the members may return to the network after a period of absence. To return to the persisted user network, in some instances, a member may search for the name of the persisted user network utilizing a user interface based on a dynamic name given to the persisted user network. In some example embodiments, upon the persisting of the temporal user network, the network creating system generates a unique Uniform Resource Locator (URL) and presents it along with the name of the persisted network to the members of the persisted network to be used to re-access the persisted user network.

Figure 9:
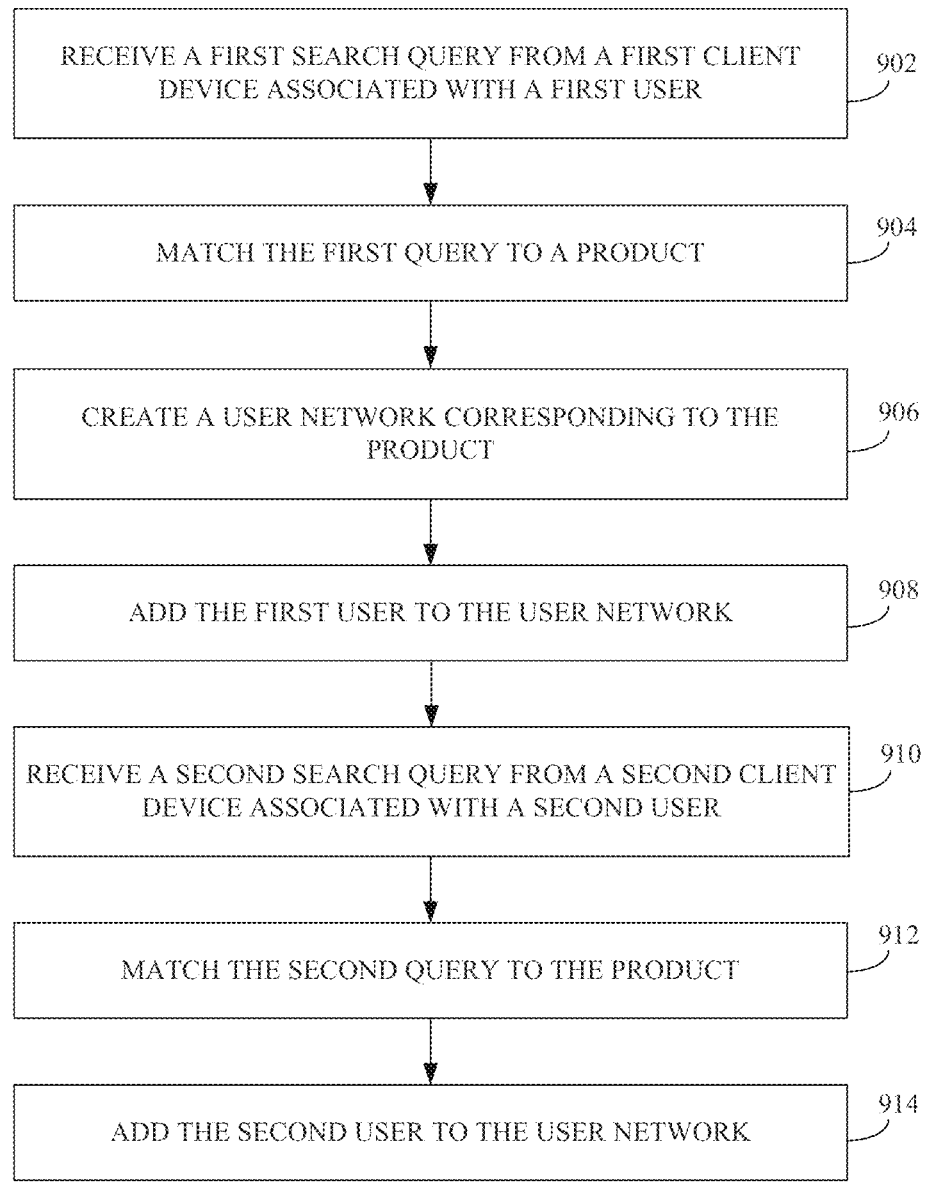
FIG. 9 is a flowchart illustrating an example method, according to various embodiments.

FIG. 9 is a flowchart illustrating an example method 900 of creating a user network based on matching user queries to a product, according to various embodiments. The inventive subject matter may be implemented for use with applications that utilize any of a variety of network or computing models, to include web-based applications, client-server applications, or even peer-to-peer applications.

Consistent with some example embodiments, the method begins at method operation 902, a first search query is received from a first client device. The first client device is associated with a first user. At operation 904, the first search query is matched to a product. At operation 906, a user network corresponding to the product is created. At operation 908, the first user is added to the user network based on the matching of the first search query to the product. At operation 910, a second search query is received from the second client device. The second client device is associated with a second user. At operation 912, the second search query is matched to the product. At operation 914, the second user is added to the user network based on the matching of the second search query to the product.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
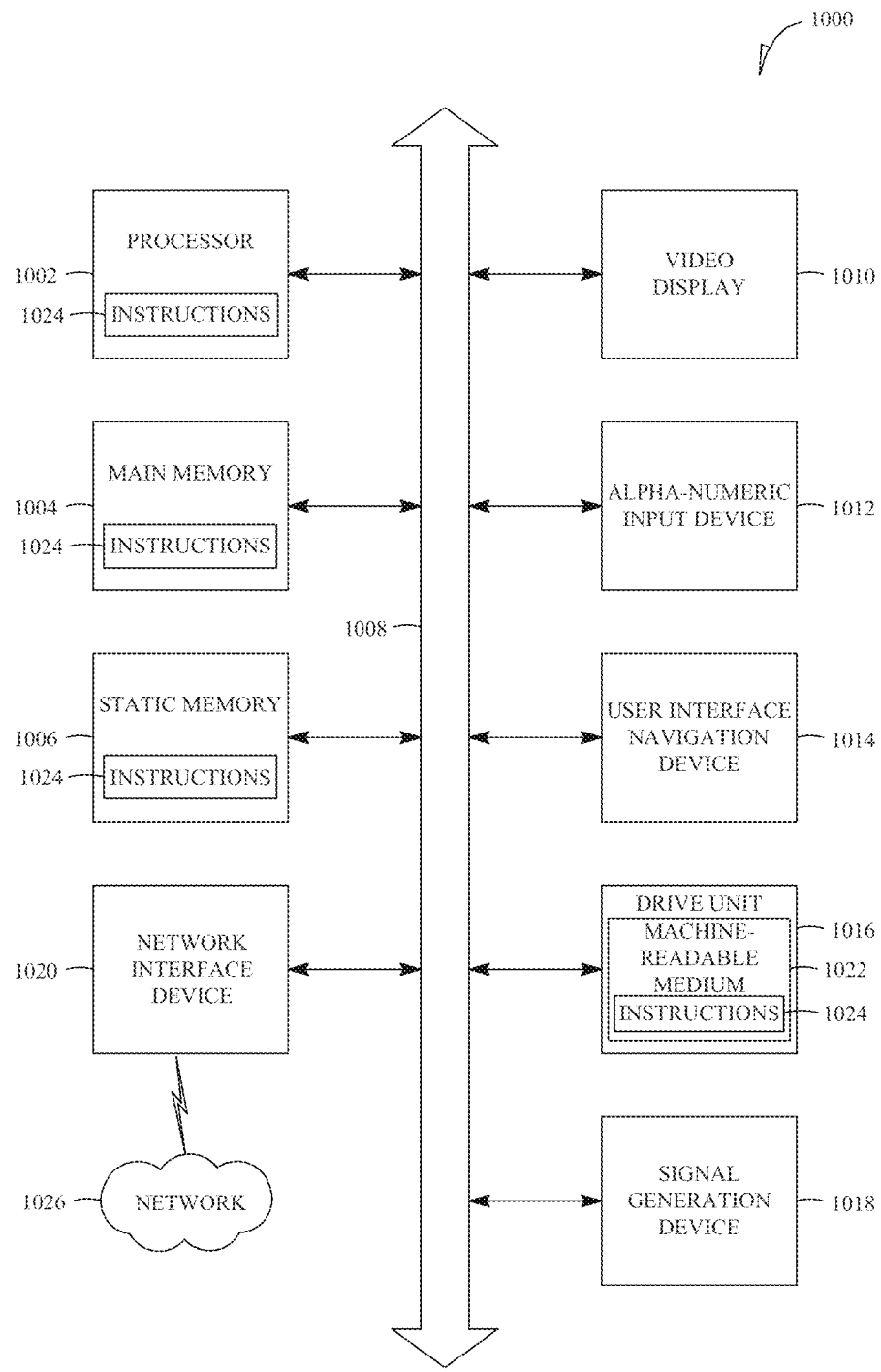
FIG. 10 is a diagrammatic representation of machine in the example form of a computer system within which a set of instructions may be executed for causing the machine to perform any one or more of the methodologies discussed herein.

FIG. 10 is a block diagram of machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   receiving, by one or more hardware processors, a first search query from a first device;
   matching, by one or more hardware processors, the first search query to an item based on a first keyword from the first search query;
   receiving, by one or more hardware processors, a second search query from a second device;
   matching, by one or more hardware processors, the second search query to the item based on a second keyword from the first search query, the first keyword being different from the second keyword;
   generating, by one or more hardware processors, a temporal user network that includes a first member associated with the first device and a second member associated with the second device, the temporal user network ceasing to exist upon detecting a departure of a last member of the temporal user network;
   detecting, by one or more hardware processors, a request from the first device to persist the temporal user network; and
   in response to detecting the request, transforming, by one or more hardware processors, the temporal user network into a permanent user network, the transforming of the temporal user network into the permanent user network including generating a Uniform Resource Locator (URL) for the permanent user network to allow a current member to access beyond a period of absence.

2. The method of claim 1, wherein the permanent user network allows previous members to return and new members to join.

3. The method of claim 1, further comprising:
   providing the URL to all members of the permanent user network for accessing the permanent user network.

4. The method of claim 1, further comprising:
   receiving, via the first device associated with the first member, a modification of a description of the item; and
   causing display of the modification of the description of the item on the second device associated with the second member.

5. The method of claim 1, further comprising:
determining a first sentiment score of the item based on one or more user inputs associated with the first member;
determining a second sentiment score of the item based on one or more user inputs associated with the second member; and
generating an aggregated sentiment score of the item based on the first sentiment score and the second sentiment score.

6. The method of claim 5, further comprising:
generating an indication of the aggregated sentiment score of the item; and
causing display of the indication of the aggregated sentiment score of the item on a device associated with a seller of the item.

7. The method of claim 1, further comprising:
receiving, from a device associated with a seller of the item, a request to join the temporal user network;
generating an identifier of the seller of the item; and
adding the identifier of the seller of the item to a plurality of identifiers associated with a plurality of members of the temporal user network.

8. The method of claim 7, further comprising:
receiving, from the device associated with the seller of the item, a description of a deal associated with the item.

9. The method of claim 8, further comprising:
determining, based on the first search query and the second search query, that the first member and the second member in the temporal user network are interested in the item; and
presenting, via the first device and the second device, the description of the deal associated with the item to the first member and the second member.

10. The method of claim 8, wherein the deal associated with the item comprises a bundle deal from the seller and a further seller who is a member of the temporal user network.

11. A system comprising:
one or more hardware processors; and
a non-transitory computer-readable medium storing instructions that, when executed by the one or more hardware processors, cause the one or more hardware processors to perform operations comprising:
receiving a first search query from a first device;
matching the first search query to an item based on a first keyword from the first search query;
receiving a second search query from a second device;
matching the second search query to the item based on a second keyword from the first search query, the first keyword being different from the second keyword;
generating a temporal user network that includes a first member associated with the first device and a second member associated with the second device, the temporal user network ceasing to exist upon detecting a departure of a last member of the temporal user network;
detecting, by one or more hardware processors, a request from the first device to persist the temporal user network; and
in response to detecting the request, transforming the temporal user network into a permanent user network, the transforming of the temporal user network into the permanent user network including generating a Uniform Resource Locator (URL) for the permanent user network to allow a current member to access beyond a period of absence.

12. The system of claim 11, wherein the permanent user network allows previous members to return and new members to join.

13. The system of claim 11, wherein the operations further comprise:
providing the URL to all members of the permanent user network for accessing the permanent user network.

14. The system of claim 11, wherein the operations further comprise:
receiving, via the first device associated with the first member, a modification of a description of the item; and
causing display of the modification of the description of the item on the second device associated with the second member.

15. The system of claim 11, wherein the operations further comprise:
determining a first sentiment score of the item based on one or more user inputs associated with the first member;
determining a second sentiment score of the item based on one or more user inputs associated with the second member; and
generating an aggregated sentiment score of the item based on the first sentiment score and the second sentiment score.

16. The system of claim 15, wherein the operations further comprise:
generating an indication of the aggregated sentiment score of the item; and
causing display of the indication of the aggregated sentiment score of the item on a device associated with a seller of the item.

17. The system of claim 11, wherein the operations further comprise:
receiving, from a device associated with a seller of the item, a request to join the temporal user network;
generating an identifier of the seller of the item; and
adding the identifier of the seller of the item to a plurality of identifiers associated with a plurality of members of the temporal user network.

18. The system of claim 17, wherein the operations further comprise:
receiving, from the device associated with the seller of the item, a description of a deal associated with the item.

19. The system of claim 18, wherein the operations further comprise:
determining, based on the first search query and the second search query, that the first member and the second member in the temporal user network are interested in the item; and
presenting, via the first device and the second device, the description of the deal associated with the item to the first member and the second member.

20. A non-transitory computer-readable medium storing instructions that, when executed by one or more hardware processors, cause the one or more hardware processors to perform operations comprising:
receiving a first search query from a first device;
matching the first search query to an item based on a first keyword from the first search query;
receiving a second search query from a second device;
matching the second search query to the item based on a second keyword from the first search query, the first keyword being different from the second keyword;
generating a temporal user network that includes a first member associated with the first device and a second member associated with the second device, the temporal user network ceasing to exist upon detecting a departure of a last member of the temporal user network;

detecting, a request from the first device to persist the temporal user network; and in response to detecting the request, transforming the temporal user network into a permanent user network, the transforming of the temporal user network into the permanent user network including generating a Uniform Resource Locator (URL) for the permanent user network to allow a current member to access beyond a period of absence.

\* \* \* \* \*